United States Patent [19]

Lange

[11] Patent Number: 5,467,661

[45] Date of Patent: Nov. 21, 1995

[54] BALL NUT AND SCREW ASSEMBLY WITH BACKDRIVE CONTROL

[75] Inventor: David A. Lange, Bay City, Mich.

[73] Assignee: Thomson Saginaw Ball Screw Company, Inc., Saginaw, Mich.

[21] Appl. No.: 232,390

[22] Filed: Apr. 25, 1994

[51] Int. Cl.[6] ............................................. F16H 55/18
[52] U.S. Cl. ............................................. 74/441; 74/459
[58] Field of Search ........................................ 74/441, 459

[56] References Cited

U.S. PATENT DOCUMENTS

| | | | |
|---|---|---|---|
| 1,645,276 | 10/1927 | Burns | 74/441 |
| 2,447,439 | 8/1948 | Thompson | 74/441 |
| 2,607,826 | 8/1952 | Barnes | 74/441 |
| 2,623,403 | 12/1952 | Terdina | 74/441 |
| 2,919,596 | 1/1960 | Kuehl | 74/441 |
| 2,936,645 | 5/1960 | Morris et al. | 74/441 |
| 3,001,414 | 9/1961 | Bourne | 74/441 |
| 3,026,070 | 3/1962 | Sutton et al. | 244/135 |
| 3,059,494 | 10/1962 | Grabowski et al. | 74/441 |
| 3,186,249 | 6/1965 | Lanzenberger | 74/441 |
| 3,479,897 | 11/1969 | Holthofer | 74/441 |
| 3,494,215 | 2/1970 | Fengler | 74/409 |
| 4,116,506 | 9/1978 | Moritomo et al. | 308/189 |
| 4,325,540 | 4/1982 | Seki et al. | 266/243 |
| 4,487,087 | 12/1984 | Johnstone | 74/441 |
| 4,643,041 | 2/1987 | Benton | 74/441 |
| 4,872,795 | 10/1984 | Davis | 74/459 |
| 4,938,090 | 7/1990 | Brusasco | 74/424.8 R |

*Primary Examiner*—Charles A. Marmor
*Assistant Examiner*—David Fenstermacher
*Attorney, Agent, or Firm*—Learman & McCulloch

[57] ABSTRACT

A ball nut and screw assembly has a backdrive control member that travels with the ball nut and has an internal thread complementary to and engaging the helical ball receiving groove on the screw. The backdrive control member is indexable on the screw relative to the ball nut to adjust the load of a spring that is interposed between the control member and ball nut. The spring acts to urge these components apart and thereby determine the frictional drag of the threaded engagement between the control member and the ball screw. The preload of the spring is set by indexing the control member to effect sufficient drag to prevent axial loads on the nut and screw from causing backdrive translation of the nut. The backdrive control member also removes lash from the ball nut and screw assembly under reversing loads at load magnitudes equal to or less than that produced by the load spring.

9 Claims, 2 Drawing Sheets

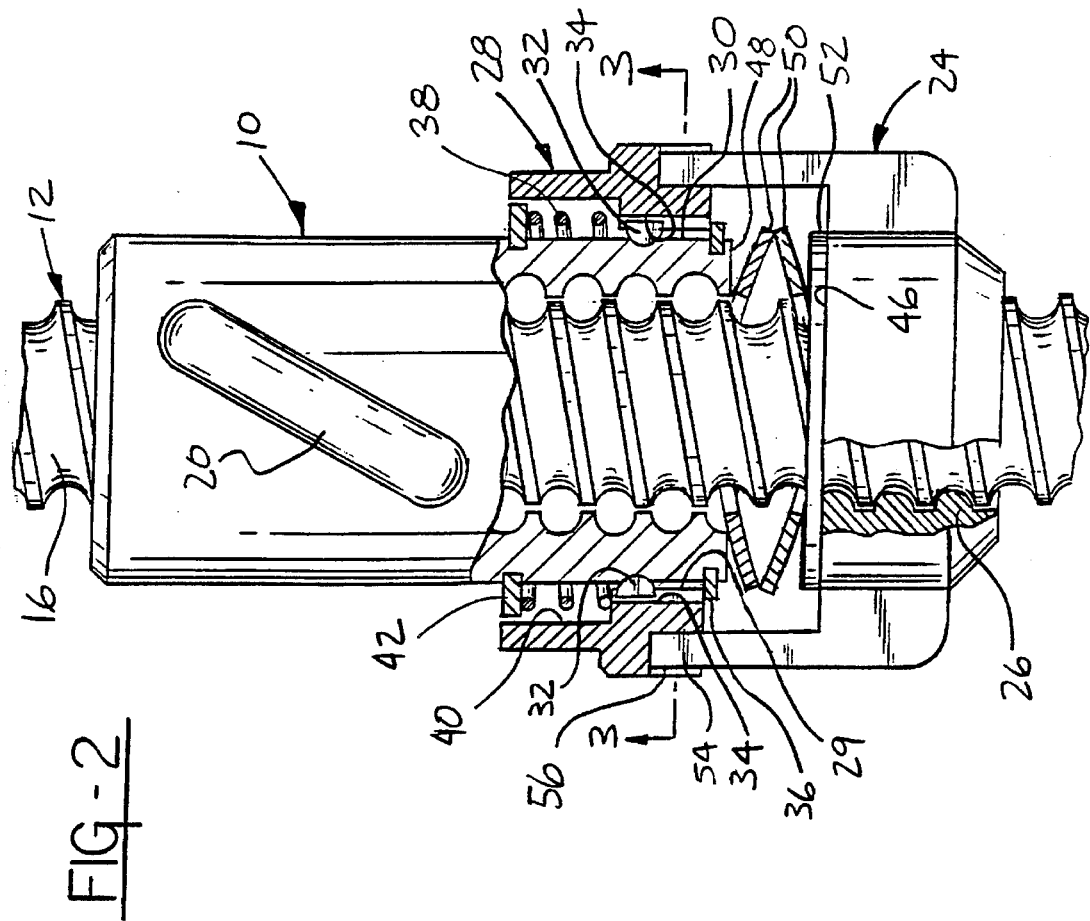
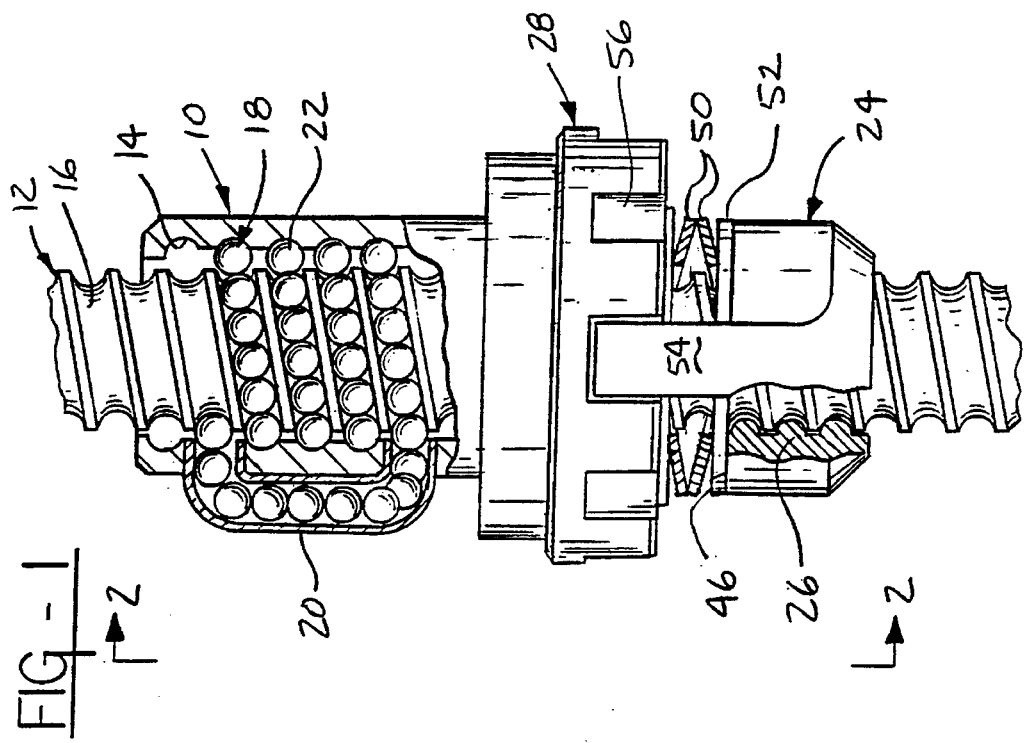

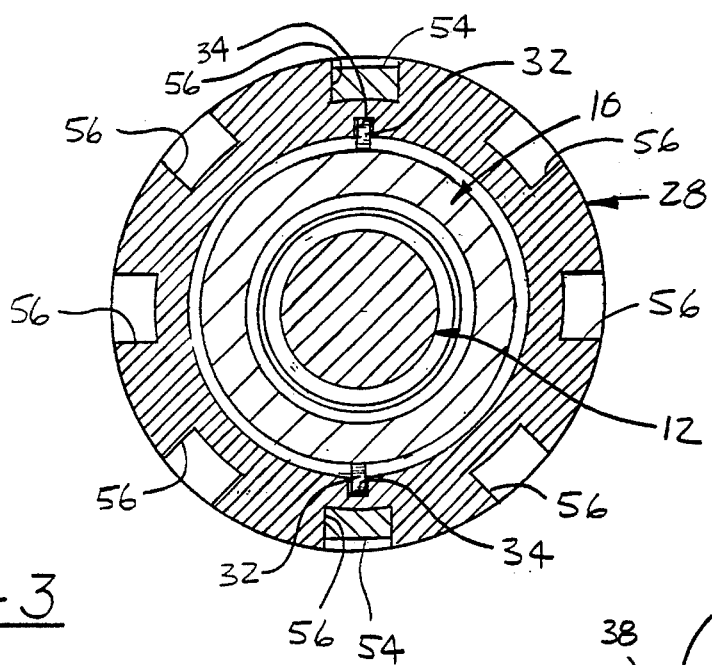
FIG-3
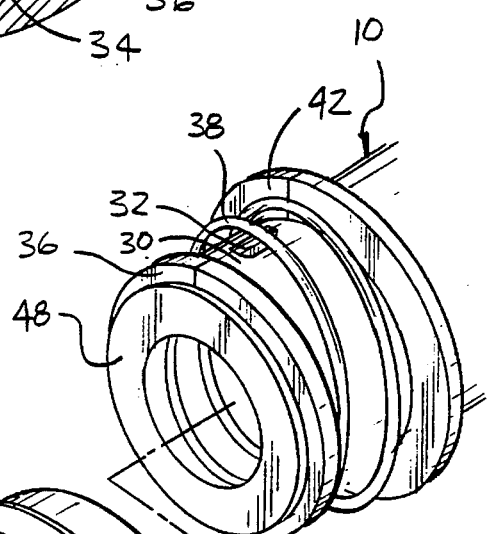
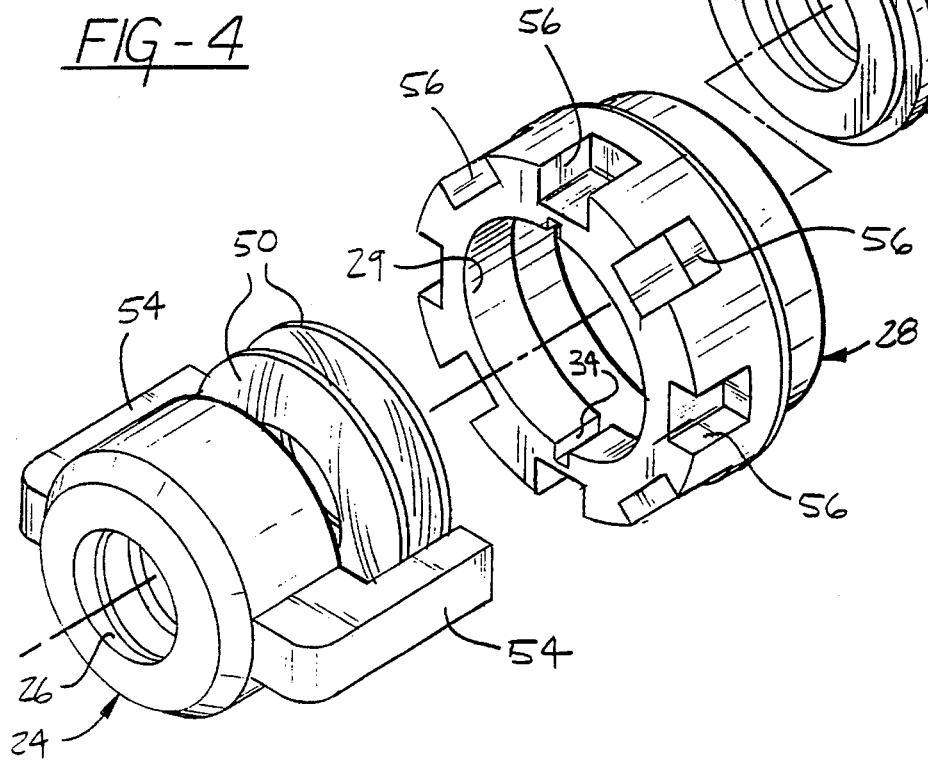
FIG-4

BALL NUT AND SCREW ASSEMBLY WITH BACKDRIVE CONTROL

TECHNICAL FIELD

This invention relates to ball nut and screw assemblies and more particularly to mechanisms for controlling backdrive therein.

BACKGROUND OF THE INVENTION

In ball nut and screw assemblies, static axial loading on the nut and screw produces a torque tending to cause relative rotation of the nut and screw and thus their relative translation. If inefficiencies within the entire ball screw drive and support system (i.e. pulleys, gears, bearings, bushings, etc.) do not produce a resisting torque equal to or greater than this static axial load induced torque, the ball screw may "backdrive" and lose position. Many ball-less nut and screw assemblies having acme threads do not backdrive because of the inherently low internal efficiency. But this low efficiency produces undesirable stick/slip operation, premature wear of the nut and screw, higher power consumption and increased heat generation.

Various mechanisms have been proposed to provide braking in a ball nut and screw assembly but they are typically costly to manufacture, require considerable accommodating space and/or require modification of the ball screw. Moreover, they are either not adapted for or are not readily adjustable to compensate for wear and/or prevent backdriving at different load levels. For example, U.S. Pat. No. 4,938,090 discloses a preloaded ball nut and screw assembly that is said to withstand continual reciprocating motion but would not prevent backdrive to any significant degree, let alone to a controlled degree. U.S. Pat. No. 2,447,439 discloses a bulky self-locking mechanism that is both complex and without easy adjustment. U.S. Pat. No. 2,623,403 discloses a restraining mechanism that uses low efficiency acme threads on it and the screw, in addition to the normal ball receiving groove on the screw. This complicates and adds to the cost of the ball screw. Moreover, this restraining mechanism is not readily adjustable to compensate for wear and different load levels.

SUMMARY OF THE INVENTION

The present invention provides a simple, compact, easy to manufacture solution for controlling backdrive in a ball nut and screw assembly permitting easy adjustment in an installation to compensate for wear and/or different load levels. This is accomplished with a backdrive control member that is received on the screw and has an internal helical thread complementary to and engaging the screw's normal ball receiving groove. The backdrive control member is coupled to turn conjointly with the nut relative to the screw and is also indexable on the screw relative to the nut to adjust the load of a spring interposed between the control member and the nut. The backdrive control member is indexable to adjust the spring load to the point where the friction between the ball receiving groove on the screw and the internal thread on the backdrive control member is just sufficient to prevent backdriving by the anticipated axial loads on the nut and screw assembly.

Thus, the backdrive control mechanism of the present invention can be readily adjusted to provide only that frictional drag that is necessary to prevent backdrive to thereby maintain the maximum efficiency then possible in the ball nut and screw assembly. For example, the ball nut and screw assembly with the backdrive control of the present invention can remain highly efficient. Furthermore, the spring load is constant and independent of the primary loads applied to the ball nut and screw assembly. As a result, the life of the internal helical thread on the backdrive control member is very predictable, and is dependent only upon the relatively light loads imparted by the spring.

It is therefore an object of the present invention to provide a new and improved ball nut and screw assembly having backdrive control.

Another object is to incorporate a backdrive control mechanism in a ball nut and screw assembly that is simple, compact and readily adjustable and does not require disassembly of the nut from the screw or modification of the ball screw.

Another object is to provide a compact ball nut and screw assembly with readily adjustable backdrive control that maintains high efficiency and long, predictable life of the ball nut and screw.

Another object of the invention is to provide a backdrive control mechanism that removes lash from the ball nut and screw assembly under reversing loads at load magnitudes equal to or less than that produced by the load spring.

These and other objects, advantages and features of the present invention will become more apparent from the following description of the preferred embodiment with reference to the accompanying drawings wherein:

BRIEF DESCRIPTION OF THE DRAWINGS

FIG. 1 is a partial longitudinal sectional view of a ball nut and screw assembly with backdrive control constructed according to the present invention;

FIG. 2 is a view taken along the line 2—2 in FIG. 1 with parts broken away when looking in the direction of the arrows;

FIG. 3 is a view taken along the line 3—3 in FIG. 2 when looking in the direction of the arrows; and FIG. 4 is an exploded view of certain parts of the backdrive control mechanism in FIG. 1.

DETAILED DESCRIPTION OF THE PREFERRED EMBODIMENT

There is illustrated in the drawings a ball nut and screw assembly comprising a nut 10 received on a screw 12. The nut and screw have complementary helical ball grooves 14 and 16 that co-operatively form a helical ball raceway 18. A return tube 20 is mounted on the nut and is connected at its opposite ends through radial passages in the nut to opposite ends of the raceway to define therewith an endless ball circuit. An endless train of balls 22 is received in the ball circuit along the length thereof to complete a helical ball drive connection between the nut and screw. The assembly as thus far described is conventional with the balls operable to effect relative translation of the nut and screw on relative rotation thereof.

In accordance with the present invention, backdrive control is provided by an annular shaped backdrive control member 24 that is received on the screw opposite one end of the nut. The backdrive control member has an internal helical thread 26 of convex cross-section complementary to and engaging the ball receiving groove 16 on the screw as illustrated in FIGS. 1 and 2. The backdrive control member 24 is coupled to turn with the nut and is also indexable about the screw relative to the nut by means of an annular preferably castellated collar 28 that is mounted on the nut for conjoint rotation therewith and limited translation relative thereto. As illustrated in FIG. 2, the collar 28 has a central bore 29 therein by which it is received and slidable along a cylindrical portion 30 of the nut. The collar 28 is prevented from turning relative to the nut while being permitted to slide therealong by two diametrically oppositely located keys 32 on the nut that are received with a slide fit in similarly located longitudinal slots 34 in the collar bore 29. See FIGS. 2 and 3. A stop to limit movement of the collar toward the backdrive control member is provided by a snap ring 36 that is mounted in a groove on the nut adjacent its end that faces the backdrive control member. The collar 28 is normally held against the snap ring stop 36 by a compression coil return spring 38. The spring 38 is received about the cylindrical nut portion 30 in a counterbore 40 in the collar and seats on a snap ring 42 that is mounted in a groove on the cylindrical nut portion at a location spaced from the other snap ring 36.

The backdrive control member 24 and nut 10 have opposing annular interfaces 46 and 48 respectively with an annular space therebetween as seen in FIG. 2. One or more simple spring washers 50 (two being shown) are received about the screw in this space and are loaded between the interfaces 46 and 48. The backdrive control member may be made of metal or engineering plastic and, in the case of the latter, a steel washer 52 is received about the screw and between the interface 46 of the plastic backdrive control member and the adjacent spring washer 50 to provide a more compatible seat therefor.

The backdrive control member 24 has tangs 54 that are located radially outward of and project axially past its interface 46 and are received in accommodating notches or slots 56 formed in the interface end of the collar 28. The tangs 54 are preferably two in number and located diametrically opposite each other. The notches 56 are typically eight in number and are equally angularly spaced at 45 degrees apart with pairs thereof thus also located diametrically opposite each other to provide alignment with and entry of the two tangs. The tangs 54 are axially receivable in any one of the diametrically opposite pairs of notches 56 to couple the backdrive control member 24 to the collar 28 and thereby to the nut 10 for conjoint turning therewith on the ball screw. The spring washers 50 urge the backdrive control member and nut axially apart and thereby load the internal thread 26 of the backdrive control member against the ball receiving groove 16 on the screw. This creates a frictional drag that opposes backdrive by the axial load applied to the nut and screw in an installation.

The width of the space between the interfaces 46 and 48 of the backdrive control member 24 and ball nut 10 determines the load by the spring washers 50 and this space is adjustable to adjust the spring load and thereby the frictional drag to control backdrive. The assembly is shown in FIG. 1 with the backdrive control member in a position producing maximum spring load and thereby maximum drag to prevent backdriving. This is the closest position of the backdrive control member to the nut. Adjustment to lower the frictional drag is accomplished by simply forcing the collar 28 away from the backdrive control member 24 against the return spring 38 until the notches 56 clear the tangs 54. The backdrive control member is then indexed or turned on the screw free of the nut and in a direction to advance the control member away from the nut to reduce the spring compression to the desired amount. The backdrive control member may then be further indexed, if need be, to where the tangs on the backdrive control member align with the then closest pair of notches on the collar. The collar is then released to engage the tangs with these notches to recouple the backdrive control member to the nut at the adjusted frictional drag.

The adjustment is preferably such that the spring load and thereby friction drag in the backdrive control member will just prevent backdriving at the loads anticipated in a particular application. It is desirous that the drag not be substantially more than is needed as this would unduly reduce the efficiency of the ball nut and screw. When wear in the threaded engagement between the backdrive control member and the ball screw reaches the point were the spring washers are not producing sufficient drag to control against backdrive, the backdrive control member is simply indexed to another position in the manner above to compensate for the wear that has occurred. While the slots 56 have been shown as provided in a collar 28, they could be provided in a traveler block connected to travel with the nut 10.

The invention has been described in an illustrative manner with respect to one embodiment, and it is to be understood that the terminology that has been used is intended to be in the nature of words of description rather than of limitation. Obviously, many modifications and variations of the present invention in light of the above teachings may be made. For example, there could be only one spring washer or more than two and the tangs could be on the nut and the notches on the backdrive control member. It is therefore to be understood that within the scope of the appended claims, the invention may be practiced otherwise than as specifically shown and described.

What is claimed is:

1. A ball nut and screw assembly with backdrive control comprising a screw, a nut received on said screw, said nut and screw having complementary helical ball receiving grooves compositely forming a raceway, balls operable in said raceway to effect relative translation of said nut and screw on relative rotation thereof wherein the translation is in a backdrive direction when the torque developed on said nut and screw by a static axial load is less than a resisting torque acting on said nut and screw, said raceway being provided with ball return portions for recirculating said balls, a backdrive control member received on said screw, said backdrive control member having an internal helical thread complementary to and engaging within the helical ball receiving groove on said screw, a spring device for urging said backdrive control member and nut axially apart to enforce frictional drag between said internal thread on said backdrive control member and said helical groove on said screw in opposition to said backdrive translation, and releasable indexable coupling means for releasably coupling said backdrive control member in a plurality of relative angular and thereby spaced apart positions on said screw whereby said backdrive control member is indexable on said screw relative to said nut to adjust the compression of said spring device to prevent said backdrive translation, said releasable indexable coupling means comprising a collar mounted externally on said nut for conjoint rotation with said nut and a limited axial translation thereon, said backdrive control member and said collar having axially engageable and disengageable tangs and notches for releasably coupling said backdrive control member to said collar and preventing relative rotation thereof, and a resilient member reactable between said collar and nut for normally holding said collar in a position in which said tangs and notches are in axially interengaged locking engagement while permitting axial withdrawal of said collar from said interengaged locking engagement to free said backdrive control member for rotation and axial displacement on said screw.

2. The ball nut and screw assembly with backdrive control as set forth in claim 1 wherein said spring means comprises at least one spring washer received about said screw between said backdrive control member and said nut.

3. The ball nut and screw assembly with backdrive control as set forth in claim 2 wherein said tangs are on said backdrive control member and said notches are on said collar means.

4. The ball nut and screw assembly with a backdrive control as set forth in claim 1 wherein said collar means comprises an annular collar received on a cylindrical portion of said nut, key and slot means for coupling said collar to said nut while permitting said collar to translate on said nut, and said resilient member comprises spring means for normally holding said collar against stop means provided on said nut axially in a position that engages selected ones of said notches with said tangs.

5. The ball nut and screw assembly as set forth in claim 4 wherein said tangs are a pair located diametrically opposite each other, and said notches are pairs in diametrically opposite locations.

6. A ball nut and screw assembly comprising a ball screw, a ball nut received on said screw, said nut and screw having complementary helical ball receiving grooves with substantially the same lead compositely forming a raceway, a train of load bearing balls operable in said raceway to effect relative translation of said nut and screw on relative rotation thereof wherein the translation is in a backdrive direction when the torque developed on said nut and screw by a static axial load is less than a resisting torque acting on said nut and screw, said raceway being provided with a ball return portion for recirculating said balls, a backdrive control member received on said screw, said backdrive control member having an internal helical thread of substantially the same lead as said nut and screw complementary to and engaging within the helical ball receiving groove on said screw, a device for urging said backdrive control member and nut axially apart to enforce frictional drag between said internal thread on said backdrive control member and said helical groove on said screw in opposition to said backdrive translation, and coupling means for releasably coupling said backdrive control member in a plurality of relative angular and thereby spaced apart positions on said screw whereby said backdrive control member is indexable on said screw relative to said nut, said coupling means incorporating a lock which prevents said coupling means from rotating independently of said nut while permitting its axial translation relative thereto, and disengageable coupling portions on said coupling means and backdrive control member in locked interengagement in one axial position of said coupling portions and in disengaged position in another axially displaced position of said coupling portions to free said backdrive control member for rotation and axial displacement on said screw.

7. In a method of controlling backdrive in a ball nut and screw assembly having a screw, a nut received on said screw, said nut and screw having complementary helical ball receiving grooves compositely forming a raceway, balls operable in said raceway to effect relative translation of said nut and screw on relative rotation thereof wherein the translation is in a backdrive direction when the torque developed on said nut and screw by a static axial load is less than a resisting torque acting on said nut and screw, said raceway being provided with ball return portions for recirculating said balls, a backdrive control member received on said screw, said backdrive control member having an internal helical thread complementary to and engaging within the helical ball receiving groove on said screw, a device for urging said backdrive control member and nut apart to enforce frictional drag between said internal thread and said helical groove on said screw in opposition to said backdrive translation, and coupling means for releasably coupling said backdrive control member in a plurality of relative angular and thereby axially spaced apart positions on said screw, said coupling means comprising a lock mounted externally on said nut to rotate therewith but translate axially thereon, and coupling portions on said lock part and backdrive control member in locked interengagement in one axial position of said coupling portions and in disengaged position in another axially displaced position to free said backdrive control member for rotation and axial displacement on said screw, the steps of;

moving said lock axially on said nut to release said backdrive control member and then indexing the relative angular positions of said backdrive control member and screw to a relative position in which the anti-backdrive torque provided by said backdrive control member substantially just overcomes the backdriving torque exerted and the high efficiency of the assembly is maintained.

8. The method of claim 7 wherein the backdrive control member removes lash from the ball nut and screw assembly under reversing loads at load magnitudes equal to or less than that produced by said device for urging said backdrive control member and nut apart.

9. A ball nut and screw assembly comprising a ball screw, a ball nut received on said screw, said nut and screw having helical ball receiving grooves with substantially the same lead compositely forming a raceway, a train of load bearing balls operable in said raceway to effect relative translation of said nut and screw on relative rotation thereof wherein the translation is in a backdrive direction when the torque developed on said nut and screw by a static axial load is less than a resisting torque acting on said nut and screw, said raceway being provided with ball return portions for recirculating said balls, a backdrive control member received on said screw, said backdrive control member having an internal helical thread of substantially the same lead as said nut and screw complementary to and engaging within the helical ball receiving groove on said screw, a device for urging said backdrive control member and nut axially apart to enforce frictional drag between said internal thread on said backdrive control member and said helical groove on said screw in opposition to said backdrive translation, and coupling means for releasably coupling said backdrive control member in a plurality of relative angular and thereby spaced apart positions on said screw whereby said backdrive control member is indexable on said screw relative to said nut, said coupling means comprising a lock mounted externally on one of the nut and backdrive control member to rotate therewith but axially translate thereon, and coupling portions on the lock and backdrive control member in locked interengagement in one position of the lock and in disengaged position in another position of the lock to free said backdrive control member for rotation and axial displacement on said screw.

* * * * *